United States Patent [19]
Guyomard et al.

[11] Patent Number: 5,192,629
[45] Date of Patent: Mar. 9, 1993

[54] HIGH-VOLTAGE-STABLE ELECTROLYTES FOR $LI_{1+x}MN_2O_4$/CARBON SECONDARY BATTERIES

[75] Inventors: Dominique Guyomard, Middletown; Jean-Marie Tarascon, Martinsville, both of N.J.

[73] Assignee: Bell Communications Research, Inc., Livingston, N.J.

[21] Appl. No.: 871,855

[22] Filed: Apr. 21, 1992

[51] Int. Cl.$^5$ .......................................... H01M 10/40
[52] U.S. Cl. ...................................... 429/197; 429/224
[58] Field of Search ............... 429/197, 194, 199, 196, 429/218, 224

[56] References Cited

U.S. PATENT DOCUMENTS

| | | | |
|---|---|---|---|
| 4,419,423 | 12/1983 | Leger | 429/199 X |
| 4,874,680 | 10/1989 | Koshiba et al. | 429/197 |
| 4,904,552 | 2/1990 | Furukawa et al. | 429/197 |
| 5,079,109 | 1/1992 | Takami et al. | 429/197 |
| 5,110,696 | 5/1992 | Shokoohi et al. | 429/218 |

FOREIGN PATENT DOCUMENTS 2022191 1/1991 Canada.

*Primary Examiner*—Anthony Skapars
*Attorney, Agent, or Firm*—Leonard C. Suchyta; Lionel N. White

[57] ABSTRACT

An electrolyte resistant to oxidation normally resulting from high voltage charging of a secondary battery comprising a $Li_{1+x}Mn_2O_4$ intercalation positive electrode comprises a 0.5M to 2M solution of $LiPF_6$ dissolved in a mixture of non-aqeuous dimethylcarbonate (DMC) and ethylene carbonate (EC) solvents wherein said solvents are present in a weight percent ratio range from about 95 DMC:5 EC to 20 DMC:80 EC.

19 Claims, 4 Drawing Sheets

HIGH-VOLTAGE-STABLE ELECTROLYTES FOR $LI_{1+x}MN_2O_4$/CARBON SECONDARY BATTERIES

BACKGROUND OF THE INVENTION

This invention relates to non-aqueous electrolyte compositions for secondary (rechargeable) lithium battery cells and, more particularly, to electrolyte compositions that are capable of resisting decomposition normally resulting from oxidation which occurs in $Li_{1+x}Mn_2O_4$/carbon cells during recharging under conditions of greater than about 4.5 V or 55° C.

The advantages generally provided by rechargeable lithium batteries are often significantly overshadowed by dangers of the reactivity of lithium in cells which comprise lithium metal as the negative electrode. A more advanced and inherently safer approach to rechargeable lithium batteries is to replace lithium metal with a material capable of reversibly intercalating lithium ions, thereby providing the so-called "rocking-chair" battery in which lithium ions "rock" between the intercalation electrodes during the charging/recharging cycles. Such a Li metal-free "rocking-chair" battery may thus be viewed as comprising two lithium-ion-absorbing electrode "sponges" separated by a lithium-ion conducting electrolyte usually comprising a Li+ salt dissolved in a non-aqueous solvent or mixture of such solvents. Numerous such salts and solvents are known in the art, as evidenced in Canadian Patent Publication No. 2,022,191, dated Jan. 30, 1991.

The output voltage of a rechargeable lithium battery cell of this type is determined by the difference between the electrochemical potential of Li within the two intercalation electrodes of the cell. Therefore, in an effective cell the positive and negative electrode materials should be able to intercalate lithium at high and low voltages, respectively. Among the alternative materials that can effectively replace lithium metal as the negative electrode, carbon provides the best compromise between large specific capacity and good reversible cycling behavior. Such use of carbon, however, presents some detractions, such as loss of average output voltage and energy density, as compared to lithium metal, since the voltage of a $Li_xC_6$ negative electrode is always greater than that of a pure lithium negative electrode.

To compensate for the loss of voltage associated with the negative electrode, a strongly oxidizing intercalation material is preferably used as the positive electrode. Such an electrode material is the spinel phase $Li_{1+x}Mn_2O_4$, usually combined with a small amount of carbon black to improve electrical conductivity and provide the practical composite electrode, that can reversibly intercalate lithium at a voltage of 4.1 V vs. Li. Use of such a strongly oxidizing intercalation material as positive electrode, however, introduces a further concern, namely, the risk of electrolyte decomposition from oxidation at the higher operating voltages, i.e. greater than about 4 V. For instance, since the voltage of the $Li_{1+x}Mn_2O_4$/Li couple is about 4.1 V, one should charge the cell up to a voltage of about 4.5 V in order to take full advantage of this redox system. As a result, the electrolyte in such a cell must be stable over a voltage window extending above 4.5 V to about 5.0 V. Also, when used in the noted "rocking chair" cells, the electrolyte compositions must be stable down to about 0 V with respect to a composite carbon negative electrode, e.g., petroleum coke combined with about 1-5% of each of carbon black (Super-S) and an inert binder.

Presently-used intercalation electrolytes, e.g., a 1M solution of $LiClO_4$ in a 50:50 mixture of ethylene carbonate (EC) and diethoxyethane (DEE) such as described in U.S. Pat. No. 5,110,696, when employed in a $Li_{1+x}Mn_2O_4$/C cell, will begin to oxidize at about 4.5 V at room temperature and as low as about 4.3 V at temperatures in the range of 55° C. Thus, to operate such a cell in the higher temperature ambient, one must reduce the charging cut-off voltage to a level below about 4.3 V in order to avoid electrolyte oxidation. Because of this lower cut-off voltage, the available capacity of the cell at about 55° C. is only 75% of that at room temperature.

When cells comprising these previously-available electrolytes are cycled to a voltage even slightly greater than 4.3 V, electrolyte oxidation occurs. Although small, this oxidation can jeopardize the capacity, cycle life, and safety of the battery cell. For example, the electrode oxidation reaction consumes part of the charging current which is then not recovered when discharging the cell, resulting in a continuous loss in the cell capacity over subsequent cycles. Further, if during each charge a small part of the electrolyte is consumed, excess electrolyte must be included when the cell is assembled. This in turn results in less active material for a constant volume battery body and consequently less initial capacity. In addition, the oxidation of the electrolyte often generates solid and gaseous byproducts, the solid of which build up a passivating layer on the particles of the active material, increasing the polarization of the cell and lowering the output voltage. Simultaneously, and more importantly, the gaseous byproducts increase the internal pressure of the cell, thereby increasing the risk of explosion and leading to unsafe and unacceptable operating conditions.

SUMMARY OF THE INVENTION

The present invention provides a class of electrolyte compositions that is exceptionally useful for minimizing electrolyte decomposition in secondary batteries comprising strongly oxidizing positive electrode materials. These electrolytes are thereby uniquely capable of enhancing the cycle life and improving the temperature performance of practical "rocking chair" cells. In our search for such an effective electrolyte, we examined literally hundreds of compositions, since the catalytic activity of the desirable positive electrode materials can not be predicted. As a result of these extensive investigations, we have discovered a group of electrolyte compositions whose range of effective stability extends up to about 5.0 V at 55° C., as well as at room temperature (about 25° C.).

In selecting an improved electrolyte, a number of basic essential factors are considered. Ideally, the temperature range of fluidity should be broad, the ionic conductivity should be high, and the charging cut-off voltage which avoids electrolyte oxidation should be high. In our selection process, the fluid temperature ranges of the compositions, i.e., between the melting and boiling points, were determined, respectively, with a differential scanning calorimeter (Perkin-Elmer Model DSC-4) and by thermometry in a common laboratory reflux apparatus. Next, the ionic conductivity of the different electrolyte compositions was measured over a wide practical temperature range (−25° C. to 65° C.) using a high frequency impedance analyzer (Hewlett Packard Model HP4129A, 5 Hz-10 MHz). Finally, the stability of the electrolytes against oxidation was determined over varying temperature and charging voltage ranges by means of a potentiostatic mode coulometer (CNRS, Grenoble, France, Model "Mac-Pile", version A-3.01e/881) using a $LiMn_2O_4$ electrode to simulate activity to be expected in a practical cell. From these determinations, we have discovered that the above-noted exceptional electrolyte results are obtained from a composition of about a 0.5M to 2M solution of $LiPF_6$, or $LiPF_6$ to which up to about an equal amount of $LiBF_4$ has been added, dissolved in a mixture of dimethylcarbonate (DMC) and ethylene carbonate (EC) wherein these solvent components are present in the weight percent ratio range from about 95 DMC:5 EC to 33 DMC:67 EC. A preferred ratio of these solvents is from about 80 DMC:20 EC to 20 DMC:80 EC.

THE DRAWING

The present invention will be described with reference to the accompanying drawing of which:

Figure 3:
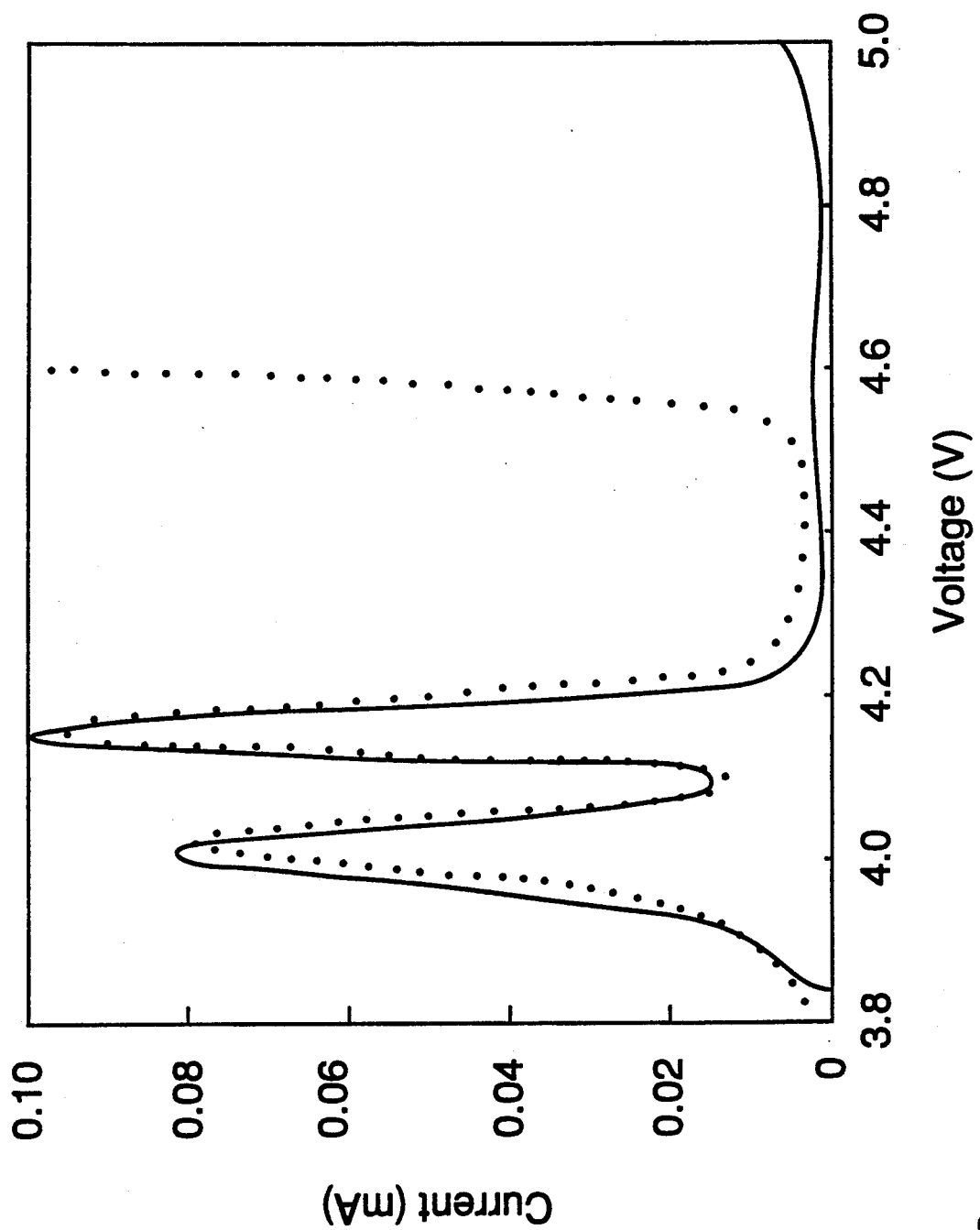
Figure 4:
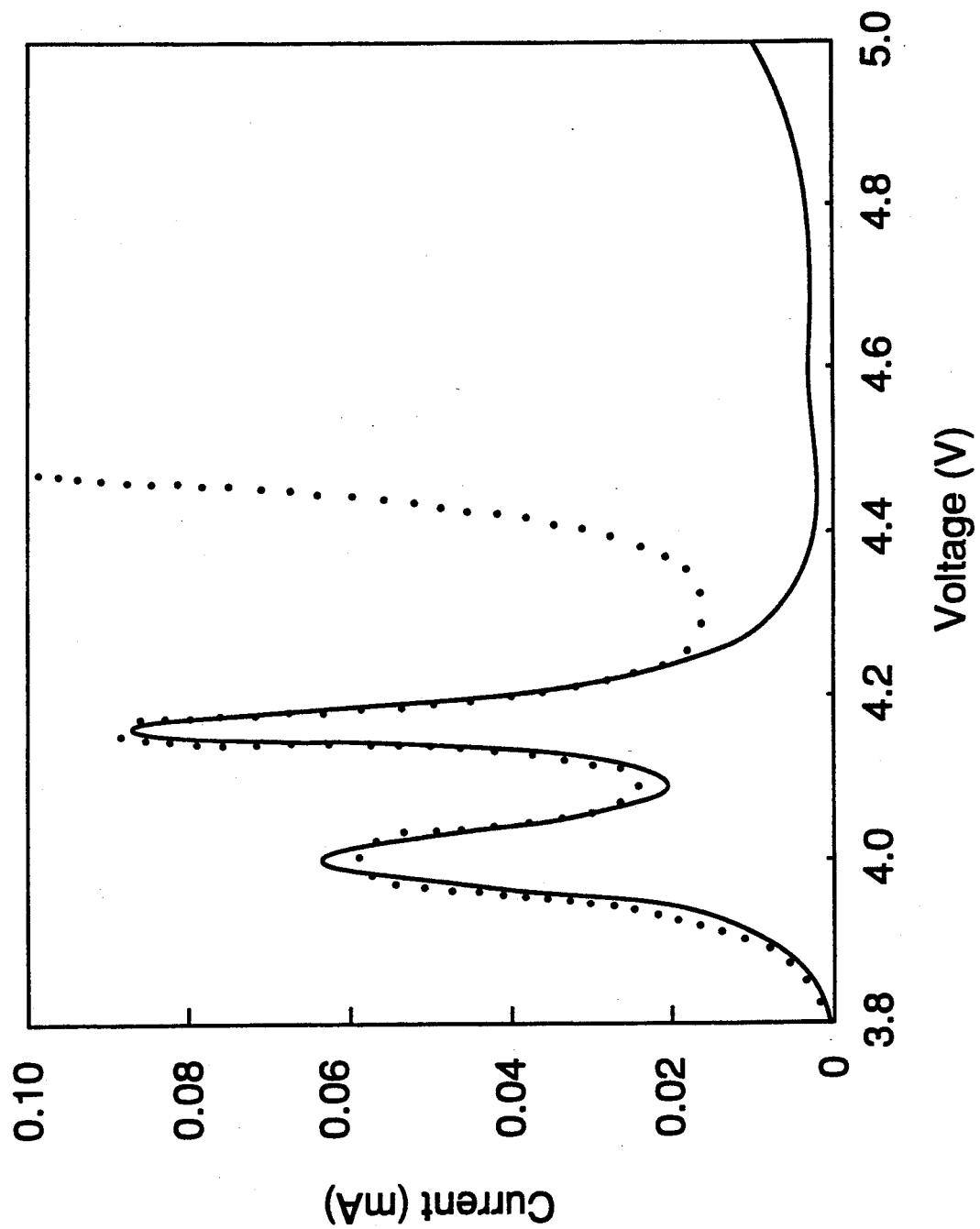

FIG. 3 depicts comparative plots of cell current against charging voltage at room temperature for secondary cells comprising a positive Li intercalation electrode and respective electrolytes of $LiClO_4$ in 50:50 EC:DEE and $LiPF_6$ in 67:33 DMC:EC; and FIG. 4 depicts comparative plots of cell current against charging voltage at 55° C. for secondary cells comprising a positive Li intercalation electrode and respective electrolytes of $LiClO_4$ in 50:50 EC:DEE and $LiPF_6$ in 67:33 DMC:EC.

DESCRIPTION OF THE INVENTION

Our investigations covered the vast range of combinations of currently known Li-bearing electrolyte salts and non-aqueous solvents, and the more commonly employed positive intercalation electrode materials. The salts included $LiAsF_6$, $LiBF_4$, $LiCF_3SO_3$, $LiClO_4$, $LiN(CF_3SO_2)_2$, and $LiPF_6$. The solvents included diethylcarbonate, diethoxyethane, dimethylcarbonate, ethylene carbonate, and propylene carbonate. The test electrode compositions comprised $LiCoO_2$, $LiMn_2O_4$, $LiNiO_2$, $MnO_2$, and $V_2O_5$.

The initial scanning of melting to boiling ranges of solutions of the various salts in the solvents and mixtures thereof indicated that 1M to 2M solutions provided generally good utility from about $-40°$ C. to $130°$ C. Subsequent testing for effective electrolytes was conducted with these solutions in the projected battery cell "working range" of about $-25°$ C. to 65° C.

Screening of the important ionic conductivity property of the candidate electrolytes revealed a widely disparate range of about 3 to 12 mS (milliSiemens or millimohs) per cm. From an evaluation of the efficacy of a prior functional "rocking chair" battery electrolyte composition comprising a 1M solution of $LiClO_4$ in a 50:50 percent ratio mixture of ethylene carbonate and diethoxyethane, a minimum threshold conductivity for this selection process was set at about 10 mS/cm. Upon this criterion, the list of prospective candidate compositions rapidly narrowed to those comprising the solvent combination of dimethylcarbonate and ethylene carbonate. Further, the salt components were limited to $LiPF_6$ and some mixtures of $LiPF_6$ and $LiBF_4$.

Figure 1:
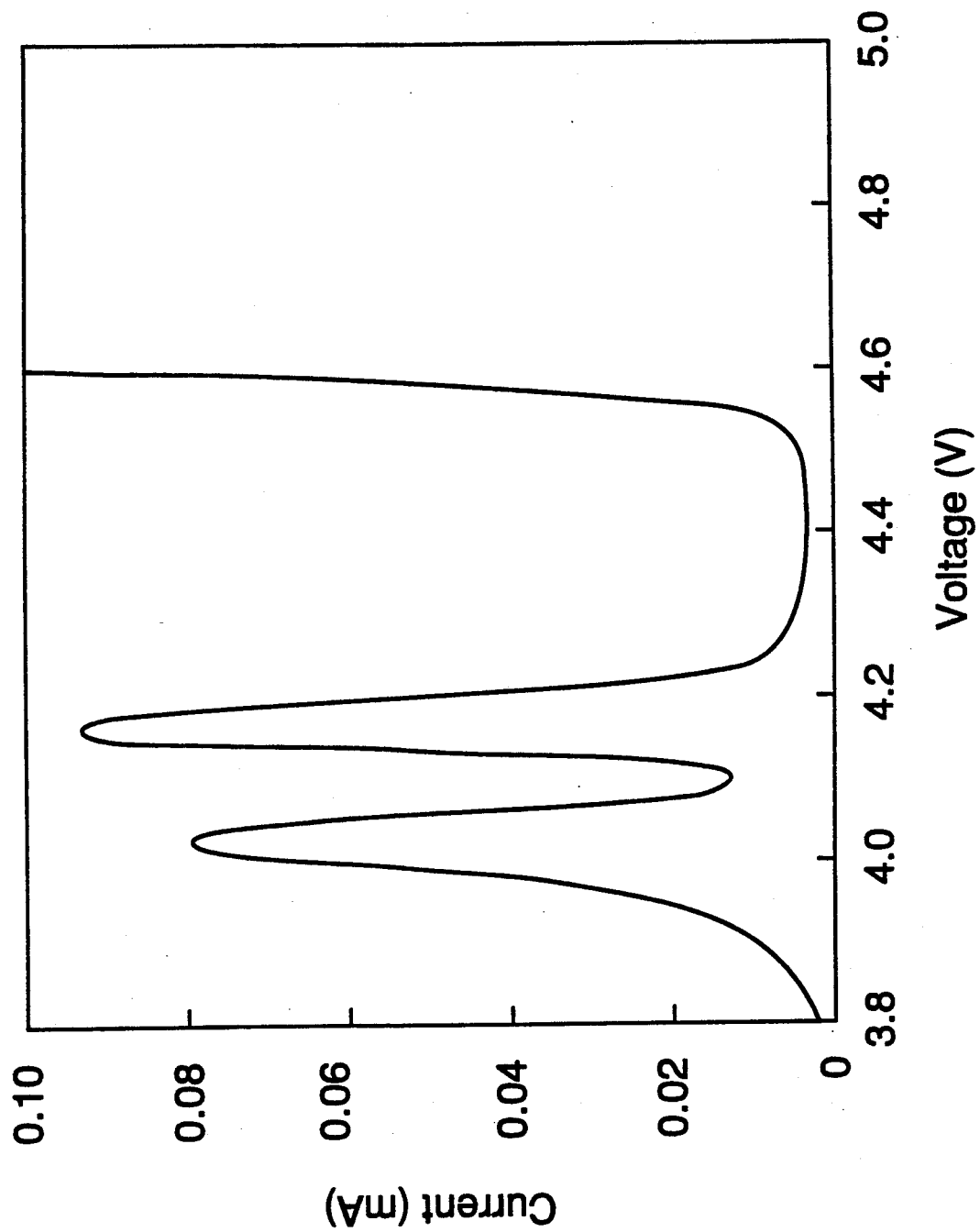
FIG. 1 depicts a plot of cell current against charging voltage at room temperature for a secondary cell comprising a positive Li intercalation electrode and an electrolyte of $LiClO_4$ in 50:50 EC:DEE.

The ultimate series of tests was conducted on these remaining compositions to determine their ability to withstand oxidation (decomposition) under recharging voltages in excess of about 4.5 V. The CNRS "Mac-Pile" data acquisition system was operated in the potentiostatic mode at a scan rate of 40 mV/hr to test candidate electrolyte compositions against 10 mg, 1 $cm^2$ samples of selected electrode material. This enabled the continuous plotting of coulometric measurements of charging voltage against cell current. From such curves the onset of electrolyte oxidation can be readily identified. This procedure can be seen with reference to FIG. 1 which plots the characteristic curve for the mentioned prior $LiClO_4$/EC +DEE electrolyte at 25° C. The peaking at about 4.05 and 4.15 V vs. Li corresponds to the reversible removal of Li from the spinel structure of a $LiMn_2O_4$ positive cell electrode, while the rapid non-reversing increase in current beginning at about 4.5 V vs. Li heralds the onset of electrolyte oxidation at that charging level.

Figure 2:
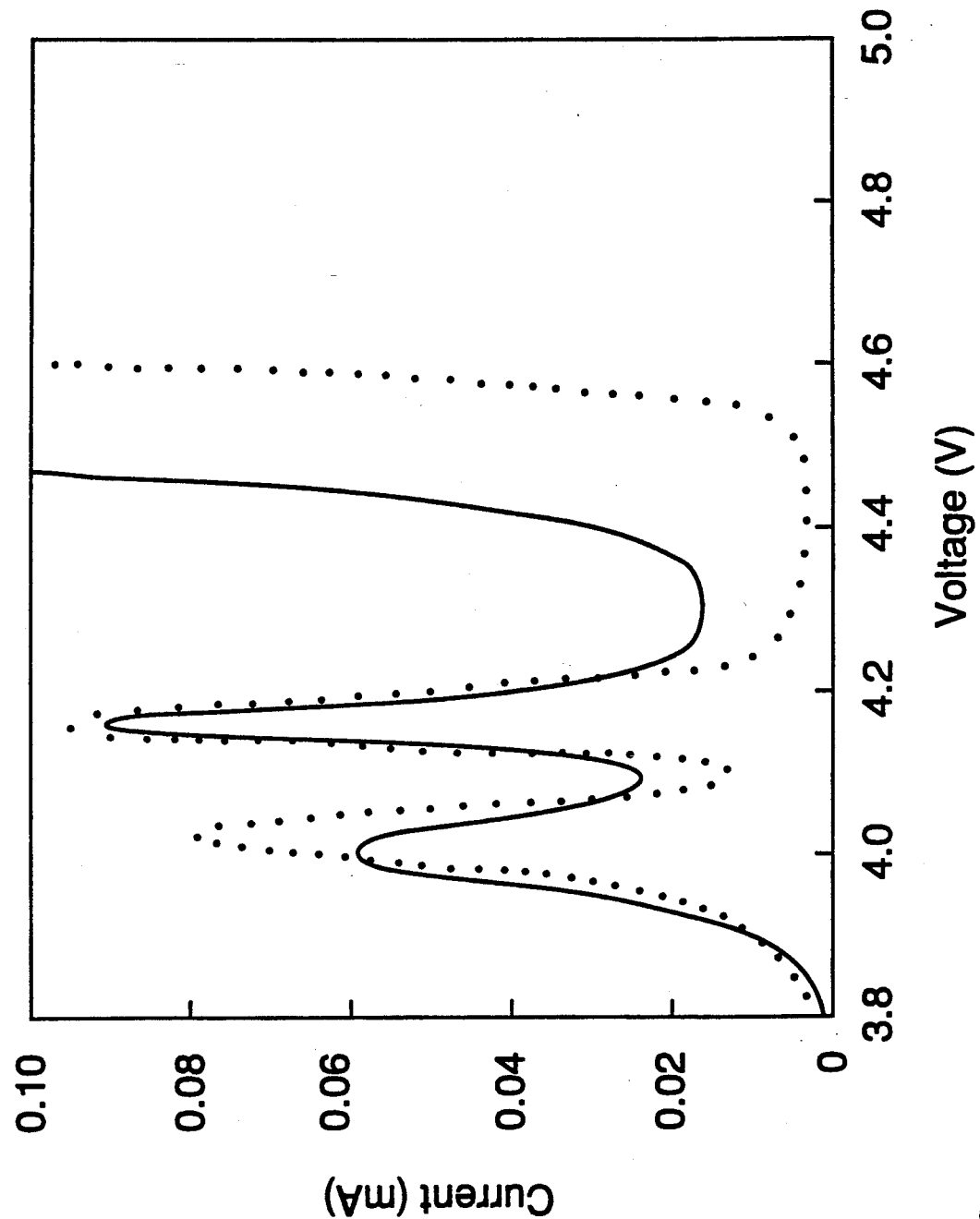
FIG. 2 depicts comparative plots of cell current against charging voltage at room temperature and at 55° C. for secondary cells comprising a positive Li intercalation electrode and an electrolyte of $LiClO_4$ in 50:50 EC:DEE.

The effect of cell operating temperature is also indicated from such plots, as can be observed from FIG. 2 which depicts results of a test of the prior $LiClO_4$ electrolyte solution at the higher end of the ambient temperature range, about 55° C. With the dotted room temperature curve of FIG. 1 as a reference, one may readily see that the kinetics governing the electrolyte oxidation reaction lead to a lower electrolyte breakdown voltage as a result of increased temperature. The initiation of electrolyte oxidation at about 4.3 V vs. Li, and at even lower voltage during later recharge cycles, indicates that the charging cut-off voltage must be limited to about 4.1 V vs. Li for practical operation at the higher temperature. As a result of this limitation, the available cell capacity is, at best, only about 75% of that at room temperature.

From this electrolyte oxidation screening, we have discovered that an exceptional, wide temperature range, oxidation resistant electrolyte for a $LiMn_2O_4$ positive electrode intercalation battery cell, particularly one utilizing the preferred $Li_{1+x}Mn_2O_4$ (0<X<1) electrode, may be realized in a 0.5M to 2M solution of $LiPF_6$, or $LiPF_6$ with up to about an equal amount of $LiBF_4$ added, in a mixture of dimethylcarbonate (DMC) and ethylene carbonate (EC) within the weight percent ratio range from about 95 DMC:5 EC to 20 DMC:80 EC. In a preferred such electrolyte solution the solvent ratio range is about 80 DMC:20 EC to 20 DMC:80 EC. An optimum composition for operation at room temperature and below is an approximately 1M $LiPF_6$ solution in a solvent mixture of about 33 DMC:67 EC, while a battery operating at higher temperatures in the range of 55° C. optimally utilizes an electrolyte consisting essentially of an approximately 1.5M $LiPF_6$ solution in a solvent combination of about 67 DMC:33 EC . An additionally useful electrolyte consists essentially of an approximately 1M to 2M solution of equal parts of $LiPF_6$ and $LiBF_4$ in a solvent mixture of about 50 DMC:50 EC.

The outstanding oxidation resistant characteristics of the preferred electrolyte compositions may be observed, with reference to the earlier-noted $LiClO_4$ composition, in FIG. 3 at room temperature and in FIG. 4 at 55° C. The negligible current increase, after the reversible Li intercalations, at voltages up to about 5 V vs. Li indicates this remarkable stability which enables enhanced cell capacity not only in the "rocking chair" cells comprising negative electrodes of carbon, e.g., petroleum coke, but also in Li negative electrode cells. Such a lithium metal cell utilizing a $Li_{1+x}Mn_2O_4$ positive electrode may be reasonably expected to achieve normal operating ranges of about 4.3 to 5.1 V.

The efficacy of the new electrolyte compositions was confirmed in common Swagelock cell recycling tests. For example, test cells were assembled with positive electrodes comprising $Li_{1+x}Mn_2O_4$ which, according to usual practice, typically included about 3–10% carbon (Super-S graphite) to improve electrical conductivity and about 1–5% of an inert binder, such as polytetrafluoroethylene. In the course of these test we noted that it was preferable to favor lower carbon content in the range of about 4–7%, since the electrolyte oxidation tendency was additionally reduced. A set of such test cells with the separator element comprising an electrolyte of 1M $LiPF_6$ in 95 DMC:5 EC and a carbon (graphite or petroleum coke) negative electrode were repeatedly charged and discharge over two hours cycles at about 25° C. and 55° C. and at charging cut-off voltages of 4.9 V and 4.5 V, respectively. Even at this cycling rate and high charging voltage, the voltage polarization was unusually small, confirming the high ionic conductivity of the electrolyte, and there was no significant loss of cell capacity, verifying the high voltage stability of the electrolyte. The ability of the electrolyte to extend the cycle life of the batteries was amply demonstrated by the remarkable fact that the cell capacities after 500 cycles was only about 10% less than after 5 cycles.

The electrolyte solutions we have discovered may be employed in practical batteries with any of the various immobilizing means that have found utility in prior cells. In addition to being used to saturate the porous separator elements normally disposed between the cell electrodes, these new electrolytes solutions may be included in the form of gelled or thickened compositions or they may be introduced into polymeric matrices as a secondary plasticizer. Such applications and other variants of this type will be apparent to the skilled artisan and are intended to be nonetheless included within the scope of the present invention as recited in the appended claims.

What is claimed is:

1. A high-voltage-stable electrolyte for a lithiated intercalation secondary battery, said electrolyte consisting essentially of about a 0.5 to 2M solution of a solute selected from the class consisting of:
   a) $LiPF_6$; and
   b) mixtures of $LiPF_6$ with up to about equal mole parts of $LIBF_4$,
dissolved in a mixture of non-aqueous dimethylcarbonate (DMC) and ethylene carbonate (EC) solvents wherein said solvents are present in a weight percent ratio range from about 95 DMC:5 EC to 20 DMC:80 EC.

2. An electrolyte according to claim 1 for a secondary battery comprising a negative electrode and a positive intercalation electrode wherein the intercalation compound consists essentially of $Li_{1+x}Mn_2O_4$ wherein x is in the range of 0 to about 1.

3. An electrolyte according to claim 2 wherein said solvents are present in a weight percent ratio range from about 80 DMC:20 EC to 20 DMC:80 EC.

4. An electrolyte according to claim 3 selected from the group consisting of:
   a) an approximately 1M solution of $LiPF_6$ in a solvent mixture of about 33 DMC:67 EC;
   b) an approximately 1.5M solution of $LiPF_6$ in a solvent mixture of about 67 DMC:33 EC; and
   c) 1M to 2M solutions of approximately equal parts of $LiPF_6$ and $LiBF_4$ in a solvent mixture of about 50 DMC:50 EC.

5. A lithiated intercalation secondary battery comprising a positive electrode, a negative electrode, and an electrolyte consisting essentially of about a 0.5M to 2M solution of a solute selected from the class consisting of:
   a) $LiPF_6$; and
   b) mixtures of $LiPF_6$ with up to about equal mole parts of $LIBF_4$,
dissolved in a mixture of non-aqueous dimethylcarbonate (DMC) and ethylene carbonate (EC) solvents wherein said solvents are present in a weight percent ratio range from about 95 DMC:5 EC to 20 DMC:80 EC.

6. A battery according to claim 5 wherein said positive electrode comprises an intercalation compound combined with about 3–10 weight percent carbon black and about 1–5 weight percent inert binder.

7. A battery according to claim 6 wherein said carbon black is present in about a 4–7 weight percent ratio.

8. A battery according to claim 6 wherein said intercalation compound consists essentially of $Li_{1+x}Mn_2O_4$ wherein x is in the range of 0 to about 1.

9. A battery according to claim 8 wherein said solvents are present in a weight percent ratio range from about 80 DMC:20 EC to 20 DMC:80 EC.

10. A battery according to claim 8 wherein said electrolyte is selected from the group consisting of:
    a) an approximately 1M solution of $LiPF_6$ in a solvent mixture of about 33 DMC:67 EC;
    b) an approximately 1.5M solution of $LiPF_6$ in a solvent mixture of about 67 DMC:33 EC; and
    c) 1M to 2M solutions of approximately equal parts of $LiPF_6$ and $LiBF_4$ in a solvent mixture of about 50 DMC:50 EC.

11. A battery according to claim 8 wherein said negative electrode consists essentially of a material selected from the group consisting of carbon and lithium metal.

12. A battery according to claim 8 wherein said negative electrode consists essentially of carbon and said electrolyte consists essentially of an approximately 1M to 1.5M solution of $LiPF_6$ in a solvent mixture of about 67 DMC:33 EC to about 33 DMC:67 EC.

13. A secondary battery comprising a negative electrode, a lithium intercalated positive electrode, and an electrolyte comprising a solution of a lithium salt in a non-aqueous solvent characterized in that said electrolyte consists essentially of an approximately 0.5 to 2M solution of a solute selected from the class consisting of:
    a) $LiPF_6$; and
    b) mixtures of $LiPF_6$ with up to about equal mole parts of $LIBF_4$,
dissolved in a mixture of non-aqueous dimethylcarbonate (DMC) and ethylene carbonate (EC) solvents wherein said solvents are present in a weight percent ratio range from about 95 DMC:5 EC to 20 DMC:80 EC.

14. A battery according to claim 13 characterized in that said positive electrode comprises an intercalation compound combined with about 3-10 weight percent carbon black and about 1-5 weight percent inert binder.

15. A battery according to claim 14 characterized in that said carbon black is present in about a 4-7 weight percent ratio.

16. A battery according to claim 14 characterized in that said positive electrode intercalation compound consists essentially of $LI_{1+x}Mn_2O_4$ wherein x is in the range of 0 to about 1.

17. A battery according to claim 14 characterized in that said electrolyte is selected from the group consisting of:
   a) an approximately 1M solution of $LiPF_6$ in a solvent mixture of about 33 DMC:67 EC;
   b) an approximately 1.5M solution of $LiPF_6$ in a solvent mixture of about 67 DMC:33 EC; and
   c) 1M to 2M solutions of approximately equal parts of $LiPF_6$ and $LiBF_4$ in a solvent mixture of about 50 DMC:50 EC.

18. A battery according to claim 14 characterized in that said negative electrode consists essentially of a material selected from the group consisting of carbon and lithium metal.

19. A battery according to claim 14 characterized in that said negative electrode consists essentially of carbon and said electrolyte consists essentially of an approximately 1M to 1.5M solution of $LiPF_6$ in a solvent mixture of about 67 DMC:33 EC to about 33 DMC:67 EC.

* * * * *

Adverse Decisions In Interference

Patent No. 5,192,629, Dominique Guyomard, Jean-Marie Tarascon, HIGH-VOLTAGE-STABLE ELECTROLYTES FOR LI1+XMN2O4/CARBON SECONDARY BATTERIES, Interference No. 103,568, final judgment adverse to the patentees rendered May 14, 1997, as to claims 1-19.
*(Official Gazette June 2, 1998)*